US011689373B2

(12) United States Patent
Hawkins et al.

(10) Patent No.: US 11,689,373 B2
(45) Date of Patent: Jun. 27, 2023

(54) APPLICATION MODULE FOR CREATING AN ASSURED RECORD OF A USER INTERACTION

(71) Applicant: VMware, Inc., Palo Alto, CA (US)

(72) Inventors: Siavash James Joorabchian Hawkins, Tonbridge (GB); Phillip Riscombe-Burton, Palo Alto, CA (US); Simon Brooks, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 98 days.

(21) Appl. No.: 16/922,551

(22) Filed: Jul. 7, 2020

(65) Prior Publication Data

US 2022/0014382 A1 Jan. 13, 2022

(51) Int. Cl.
*H04L 9/32* (2006.01)
*G06F 9/451* (2018.01)

(52) U.S. Cl.
CPC ............ *H04L 9/3247* (2013.01); *G06F 9/451* (2018.02)

(58) Field of Classification Search
CPC .............................. G06F 9/451; H04L 9/3247
See application file for complete search history.

(56) References Cited

U.S. PATENT DOCUMENTS

| 8,863,252 | B1 | 10/2014 | Katzer |
| 10,091,195 | B2 | 10/2018 | Lindemann |
| 10,237,070 | B2 | 3/2019 | Lindemann |
| 10,909,644 | B2 | 2/2021 | Zhiguo |
| 10,939,295 | B1 | 3/2021 | Avetisov |
| 11,250,528 | B2 | 2/2022 | Zhiguo |
| 11,438,764 | B2 | 9/2022 | Avetisov |
| 2006/0179009 | A1* | 8/2006 | Tagg ....................... G06Q 10/10 705/80 |
| 2007/0083926 | A1* | 4/2007 | Burkhart ............... G06F 21/105 726/21 |
| 2013/0185807 | A1* | 7/2013 | Rodriguez .............. G06F 21/10 726/28 |
| 2015/0015806 | A1 | 1/2015 | Wu |

(Continued)

OTHER PUBLICATIONS

Reineh et al., "Enabling Secure and Usable Mobile Application: Revealing the Nuts and Bolts of software TPM in today's Mobile Devices," arXiv:1606.02995v1 [cs.CR], Jun. 9, 2016. (Year: 2016).*

(Continued)

*Primary Examiner* — Eric J. Bycer
(74) *Attorney, Agent, or Firm* — Clayton, McKay & Bailey, PC (57) ABSTRACT

Systems and methods are included for creating an assured record of a user interaction. An application on a user device can receive an agreement. The agreement can include a specification with instructions for assuring the user interaction. The application can pass the agreement to an assured module installed in the application. The assured module can present the agreement to a user in an interface. The assured module can receive user input indicating acceptance or rejection of the agreement. The assured module can generate a confirmation file that confirms the user interaction. The assured module can sign the confirmation file with a digital signature that can be used by other entities to verify the authenticity of the confirmation file.

20 Claims, 7 Drawing Sheets

(56) References Cited

U.S. PATENT DOCUMENTS

| | | |
|---|---|---|
| 2016/0197885 A1 | 7/2016 | Cismas |
| 2018/0005186 A1* | 1/2018 | Hunn .................... G06F 21/645 |
| 2019/0158275 A1* | 5/2019 | Beck ............... G06Q 20/38215 |
| 2019/0305957 A1* | 10/2019 | Reddy ....................... G06F 8/60 |
| 2020/0143337 A1* | 5/2020 | Conroy .............. G06F 16/1824 |
| 2020/0167503 A1* | 5/2020 | Wei ....................... G06F 21/602 |
| 2021/0044976 A1 | 2/2021 | Avetisov |
| 2022/0006620 A1 | 1/2022 | Bursell |

OTHER PUBLICATIONS

Asokan et al., "Mobile Trusted Computing," Proceedings of the IEEE, vol. 102, No. 8, Aug. 2014, pp. 1189-1206. (Year: 2014).*

Gupta et al., "Smart Contract Privacy Protection Using AI in Cyber-Physical Systems: Tools, Techniques and Challenges," IEEE Access, Feb. 10, 2020, pp. 24746-24771. (Year: 2020).*

Zhou et al., "Using Asynchronous Collaborative Attestation to Build a Trusted Computing Environment for Mobile Applications," IEEE 2017. (Year: 2017).*

Zheng et al., "Trusted Runtime Environment Building Technology for Mobile Terminals," 2019 International Conference on Intelligent Computing, Automation and Systems, pp. 76-80. (Year: 2019).*

Hayton, Richard "What is a Trusted User Interface?—The Benefits of Trusted User Interface (TUI)," Jul. 1, 2020, retrieved from https://www.trustonic.com/technical-articles/benefits-trusted-user-interface/ on Mar. 26, 2022 (reader mode). (Year: 2020).*

Arfaoui et al., "Trusted Execution Environments: A look under the hood," 2014 2nd IEEE International Conference on Mobile Cloud Computing, Services, and Engineering, pp. 259-266. (Year: 2014).*

\* cited by examiner

APPLICATION MODULE FOR CREATING AN ASSURED RECORD OF A USER INTERACTION

BACKGROUND

With the growing use and reliance on network and computing technology, organizations, particularly enterprise businesses, are frequently attacked by hacking attempts and other types of fraudulent activity. Enterprise systems are usually designed to protect themselves from outside threats, but to trust entities within. However, hackers can capitalize on this type of system architecture because once a hacker is able to breach the exterior security, the system then treats the hacker as a trusted identity. This allows a hacker to then move throughout the system with minimal resistance.

For these reasons, many businesses have begun implementing a Zero Trust model, whereby the enterprise system does not assume any actor, system or service should be automatically trusted, even if inside the system perimeter. The system instead requires identity verification for any device attempting to access system resources. One method commonly used to implement a Zero Trust model is a hardware security module, such as a Trusted Execution Environment (TEE). A TEE is an isolated and secure area of device's processor that creates and stores encryption keys that it never shares. It can also encrypt and decrypt files using those keys. Often TEEs are designed to erase all its stored keys when it determines that someone is trying to break into it.

However, for security reasons TEEs and other hardware security modules have very limited capability. For example, while some TEEs can use a type of Trusted User Interface (TUI), which is an interface for the TEE that runs independent of a device's operating system, a TUI can typically only display text. While a TEE is appropriate for some cases of verifying an identity, its limited functionality prevents it from being able to assure certain kinds of user interactions. For example, an application may require a certain type of user interaction to verify that a user has accepted its terms of use. Because a TEE can only display information in an interface, it cannot verify types of user interactions.

As a result, a need exists for a system by which a user interaction can be specified and executed in such a way that an assured record can be made of the choices made by the user in the interaction.

SUMMARY

Examples described herein include systems and methods for creating an assured record of a user interaction. In one example, an application on a user device can receive an agreement that requires assurance. For example, the application can require proof of a certain user interaction, such as a user accepting terms of use. The agreement can be received from an agreement service that is responsible for generating and recording agreements, for example. The agreement service can provide the agreement to the application in response to a request from the application. In one example, the agreement service can also create a specification, which can include instructions for the assurance module to verify the user interaction.

In an example, the application can include an assurance module. The assurance module can be responsible for verifying user interactions. In some examples, the assurance module can be a trusted module for an enterprise, whereas the application is not trusted. The assurance module can also operate independently of the application. In one example, the application can send the agreement to the assurance module. The assurance module can execute the instructions in the specification, which can include presenting the agreement in a user interface in a manner provided in the specification. In an example, the presented agreement can instruct a user on how to interact with the agreement. A user can then interact with the agreement in the manner instructed. The assurance module can receive the user input indicating acceptance of the agreement.

In an example, the assurance module can generate a confirmation file indicating that the user properly accepted the agreement. The confirmation file can include a digital signature provided by the assurance module that verifies the integrity of the assurance module. In one example, the confirmation file can include information about the user device that the specification requires. In some examples, the confirmation file can be sent to the agreement service, which can then verify the signature and record the confirmation file.

Some examples described herein include systems and methods for integrating a user interaction assurance module with a Trusted Execution Environment (TEE) for creating an assured record of a user interaction. In one example, the assurance module can receive an agreement that requires assurance. For example, the assurance module can be part of an application. The application can require proof of a certain user interaction, such as a user accepting terms of use. The application can request an agreement from an agreement service. The agreement service can generate the agreement and send it to the application. In some examples, the agreement service can also create a specification with instructions for assuring the user interaction. The application can then pass the agreement and specification to the assurance module. In an example, the assurance module can verify the identity of the agreement service.

In one example, the assured module can convert the agreement to an image. In some examples, the agreement can be provided as an image from the agreement service. The assured module can pass the agreement image to a TEE on the user device. The TEE can present the agreement image in a Trusted User Interface (TUI). A user can then interact with the agreement to indicate acceptance. The TUI can receive user inputs indicating selection locations on the agreement image. The TUI can generate an interaction record with the selection locations. The TEE can sign the interaction record using a stored agreement signing key. The TEE can hand over the signed interaction record to the assurance module.

In some examples, the signed interaction record can serve as assurance of the user interaction. Alternatively, the assurance module can take additional steps. For example, the assurance module can define interaction zones on the image. The interaction zones can be defined using a dual-axis coordinate system, for example. The assurance module can use the interaction record to determine the interactions zones selected by the user and whether they indicate acceptance of the agreement in the manner provided by the specification. If acceptance can be verified, the assurance module can generate and sign a confirmation file that includes the interaction record. In some examples, the application can send the confirmation file to the agreement service to be verified and recorded.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are included for creating an assured record of a user interaction. An assured module can be installed in an application on a user device. The application can request an agreement that requires assurance from an agreement service. The agreement service can generate the agreement and send it to the application. The agreement can include a specification with instructions for assuring the user interaction. The application can pass the agreement to the assured module. The assured module can present the agreement to a user in an interface in a manner provided in the specification. The assured module can receive user input indicating acceptance of the agreement. The assured module can generate a confirmation file that confirms the user interaction, and digitally sign the confirmation file using a digital signature that can be used by other entities to verify the authenticity of the assured module and the confirmation file.

Systems and methods are included for creating an assured record of a user interaction using an assured module and a Trusted Execution Environment (TEE). An assured module installed on an application can receive an agreement that requires assurance. The assured module can convert the agreement to an image file and pass the image file to the TEE. The TEE can display the image file in a Trusted User Interface (TUI). The TUI can receive user input indicating selections of locations on the image. The TUI can create an interaction record with the selection locations. The TEE can sign the interaction record using a stored agreement signing key and pass the signed interaction record to the assured module. The assured module can generate a confirmation file that includes the interaction record. In some examples, the assured module can also use the interaction record to verify that the user interacted with the agreement in the manner required to indicate acceptance.

Figure 1:
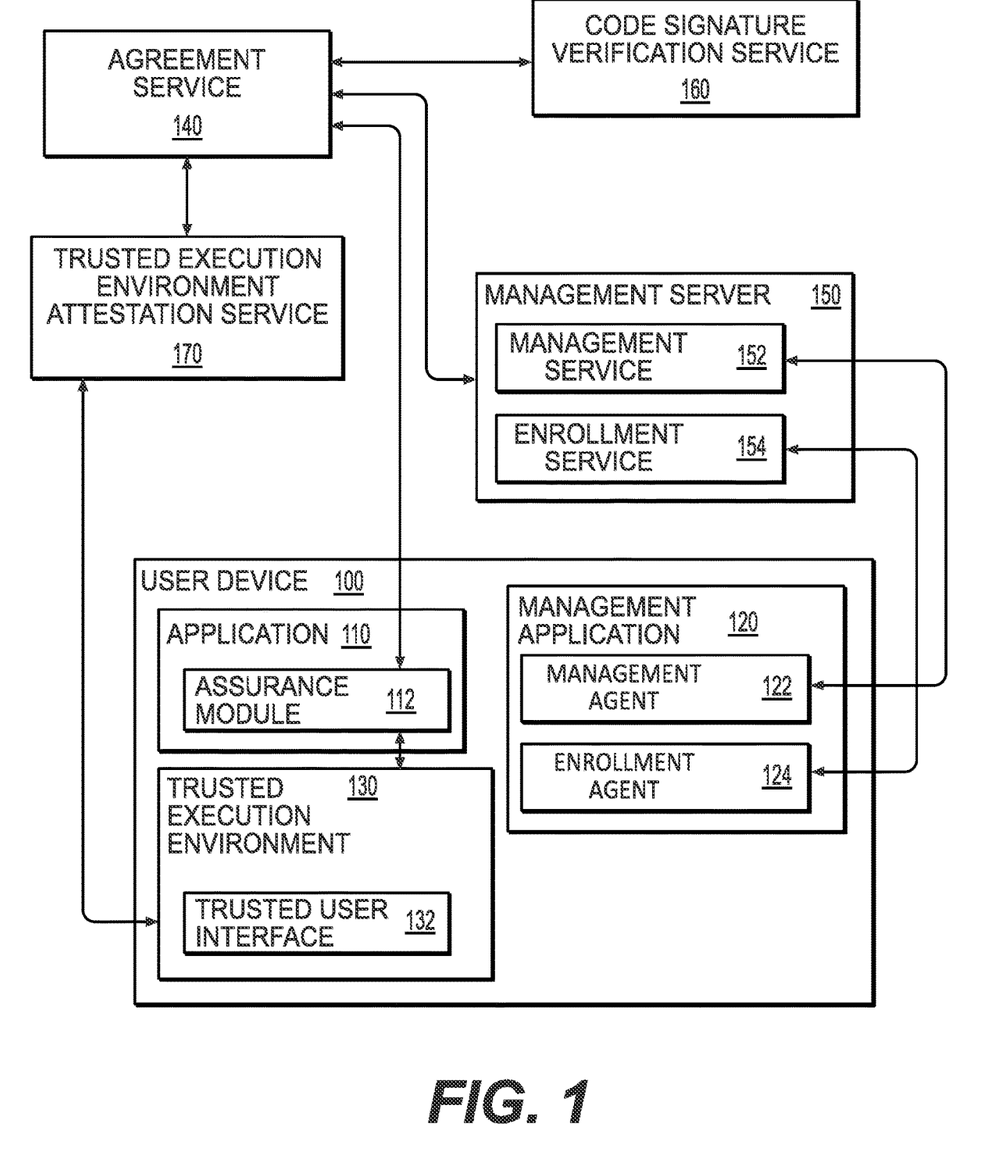
FIG. 1 is an illustration of an example system for creating an assured record of a user interaction.

FIG. 1 is an illustration of an example system for creating an assured record of a user interaction. Such a system can include a user device 100 that includes an application 110. The user device 100 can be one or more processor-based devices, such as a personal computer, tablet, or cell phone. The application 110 can be installed on the user device 100 and include an assurance module 112. The assurance module 112 can be a self-contained component of the application 110 that performs discrete functions. In some examples, the assurance module 112 can include restriction mechanisms that contribute to a level of assurance. As an example, the assurance module 112 can limit or block interactions with untrusted sources. As another example, the assurance module 112 can be configured to only perform certain preprogrammed actions in response to requests from certain trusted sources.

In some examples, the assurance module 112 can be inserted into existing applications 110. For example, some applications allow software modules to be added to an already instance of the application on a device. As an example, some MICROSOFT OFFICE applications, such as WORD and EXCEL, have an add-in feature that allow the applications to interact with Hypertext Markup Language (HTML), Cascading Style Sheets (CSS), and JAVASCRIPT (JS) web technologies. In some examples, the application 110 can include this type of functionality, and the assurance module 112 can be added to the application 110 as an independent module. In another example, the same assurance module 112 can be interacted with by multiple different applications 110 and can persist on the user device 110 separate from those applications 110. In one example, the assurance module 112 can be installed at build-time of the user device 110.

The assurance module 112 can be configured to assure a user interaction. In other words, the assurance module 112 can guarantee that a user performed a certain task. Such interactions, or tasks, can have a defined start and finish. An example of such an interaction or task can include accepting terms and/or conditions of an agreement. In one example, the assurance module 112 can assure that a user accepted conditions of use of an end user license agreement (EULA). In another example, the assurance module 112 can assure that a user has agreed to a privacy agreement where the user agrees to share certain information, such as usage or telemetry data. The process by which the assurance module 112 assures such interactions is described in detail later herein.

The application 110 can communicate with an agreement service 140 in assuring user interactions. Numerous examples of are described herein that include communications between the various system components. The terms "communicate," "transmit," "send," and "hand over" are used throughout to describe such communications. These communications can be done using various methods, including for example, using a database query or an application programming interface (API) call, using structured text such as JAVASCRIPT Object Notation (JSON) or Extensible Markup Language (XML).

The agreement service 140 can be responsible for generating, verifying, and recording agreements. In one example, the agreement service 140 can be a service on a server, such as single server or a group of servers, including multiple servers implemented virtually across multiple computing platforms. Alternatively, the agreement service 140 can be installed on the user device 100. For example, the agreement service can be part of management application 120.

In one example, the agreement server 140 can generate an agreement in response to a request from the application 110 or the assurance module 112. The agreement server 140 can also generate a specification that can include actions required for assurance. The specification can also include other elements for assurance, such as visual and interactive elements and an identifier associated with the user or the user device 100. In an example, the agreement can be part of the specification. The specification can use, for example, HTML, CSS, or JS. In an example, the agreement service 140 can sign the specification by, as an example, using a code signature. The signature can confirm to the assurance module 112 that the agreement service 140 authored the specification and guarantees that the code has not been altered or corrupted since it was signed. In one example, the agreement service 140 can employ a code signature verification service 160 for signing the and verifying the specification. The code signature verification service 160 can be a service that utilizes a cryptographic hash to validate authenticity and integrity. In some examples, the agreement service 140 can also be configured to verify signed agreements from the assured module 112, check the integrity of the assured module 112, and record signed agreements.

In some examples, the assurance module 112 can interact with a TEE 130 to provide assurance. The TEE 130 can be an isolated and secure area of the user device's 100 main processor. The TEE 130 can guarantee the confidentiality and integrity of any code or data loaded into it. The TEE 130 can include a TUI 132. The TEE 132 can be a secured interface controlled by the TEE 130. The TEE 130 and TUI 132 can operate independent of the user device's 100 operating system (OS), which protects them from any malware on the OS. In some examples, the TEE 130 can temporarily take over the OS and input mechanisms of the user device 100 at the hardware level, allowing it to present the TUI 132 on the user device's 100 display.

In one example, the Trusted Execution Environment Attestation Service (TEAS) 170 can be a service that verifies TEE signatures. For example, the TEE 130 can sign an agreement using an encryption key for which the TEAS 170 has the corresponding decryption key. In an example, the agreement service 140 can send signed, encrypted agreements to the TEAS 170, and the TEAS 170 can in turn decrypt the agreement and verify the agreement's integrity to the agreement service 140.

In some examples, the user device 100 can also include a management application 120. The management application 120 can be a stand-alone application, part of an enterprise application, or part of an operating system of the user device 100. The management application 120 can be part of an enterprise Unified Endpoint Management system (UEMS) that manages and secures user devices that are enrolled with an enterprise. For example, the management application 120 can be responsible for ensuring that user devices are up to date with compliance and security settings prior to accessing enterprise data and resources. In an example, the management and security of the user device 100 can be handled by a management agent 122. The management agent 122 can communicate with a management server 150, allowing UEMS management of user devices 100 based on compliance and security settings at the management server 150. In an example, the compliance and security settings can be handled by a management service 152 on the management server 150. The management agent 122 can enforce compliance at the user device 100, such as by wiping enterprise data when compliance standards are not met. Example compliance standards can include ensuring a device is not jailbroken, that particular encryption standards are used in enterprise data transmission, that the device does not have any forbidden applications installed or running, and that the device is located within a geofenced area when accessing certain enterprise resources.

In an example, the management application 120 can include an enrollment agent 124 that handles enrolling the user device 100 with a UEMS from the device end. For example, a user who wants to enroll the user device 100 with a UEMS can load the management application 120 and request enrollment. The enrollment agent 124 can send the request and user credentials to the management server 150. An enrollment service 154 on the management server 150 can verify the credentials and enroll the user device 100. Once enrolled, the user device 100 can be given access to enterprise resources, including enterprise applications and data files. Access to enterprise resources can be conditional on the user device 100 remaining compliant with UEMS policies, which can be handled by the management agent 122.

In an example, the application 110 can be managed by the management application 120. A managed application 110 can allow an enterprise to control access and functionality of the application 110. The managed application 110 can persist locally on the user device 100 or can be accessed from within the management application 120, depending on the example. Even when an application 110 is accessed remotely, portions of that application 110 or data utilized by the application 110 can exist locally on the user device 100. Local resources can be encrypted and decrypted for use by the management application 120 or some other process of the UEMS. In some examples, the assurance module 112 can be a component of the management application 120.

Figure 2:
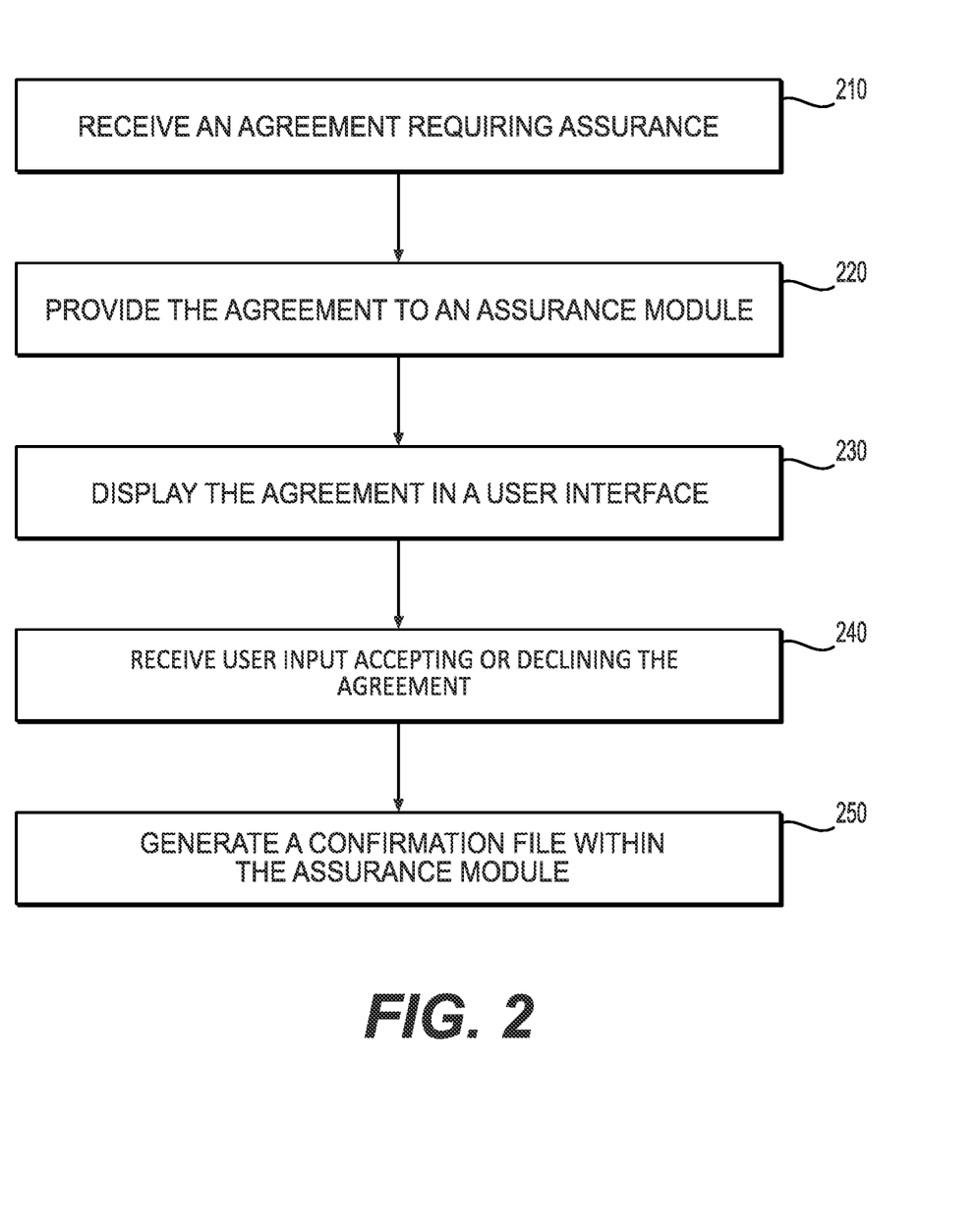
FIG. 2 is a flowchart of an example method for creating an assured record of a user interaction.

FIG. 2 is flowchart of an example method for creating an assured record of a user interaction using a secured application module. At stage 210, the application 110 can receive an agreement that requires assurance. In an example, the application 110 can request an agreement from the agreement service 140. The agreement service 140 can then generate and send the requested agreement to the agreement service 140. In an example, the agreement service 140 can digitally sign the agreement using, for example, a cryptographic hash for which the assurance module 112 has a key. Although reference to agreements is used throughout, the assurance module 112 can be used to verify other types of user interactions.

In an example, the agreement can be part of, or be accompanied by, a specification. The specification can state what actions constitute completion of the user interaction. For example, the specification can include code or other instructions that the assured module 112 must follow to properly confirm the user interaction. In one example, the specification can include visual and/or interactive elements. As an example, the specification can include an image file to be presented to the user and a set of locations that the user must select on the image in a certain order. In some examples, the specification can be personalized to the user. For example, when sending a request for an agreement, the application 110 can also send a device or user identifier. Some examples of identifiers can include a username, an International Mobile Equipment Identity (IMEI) number, and a model and serial number combination. The agreement service 140 can use the identifier to generate a user- or device-specific specification.

At stage 220, the application 110 can send the agreement over to the assurance module 112. Although the assurance module 112 can be integrated into the application 110 as a module, it can operate independently of the application 110. For example, to preserve the integrity of the assurance module 112, it can be configured to limit interactions with the application 110 to receiving and confirming agreements. However, the assurance module 112 can allow additional interactions with a trusted source, such as the agreement service 140. The assurance module 112 can require that the source of any received instructions, such as a specification, be verified prior to executing. For example, agreements and specifications from the agreement service 140 can include a digital signature. The agreement assurance module 112 can use a hash key to decrypt the digital signature.

At stage 230, the assurance module 112 can display the agreement to a user in a user interface. In one example, the user interface can be part of the application 110. In another example, the assurance module 110 can display its own separate user interface. In a third example, the agreement can be displayed by another application or component of the user device 100, such as a TUI, which is describe later herein. In some examples, the assurance module 112 can use an embedded web view control, such as ANDROID WEBVIEW or IOS WKWEBVIEW. The embedded web view control can have a restricted configuration that limits or blocks any external resources. In an example, such restrictions can be provided in the specification. Using an embedded web view control can allow the assured module 112 to support rich and standard application interactions.

At stage 240, the assurance module 112 can receive user input accepting and declining the agreement. The type of user input required and received can be provided by the specification, and it can depend the level of assurance needed. For example, some simple user interaction requirements can include a user taping or selecting of one or more designated areas, such as checkboxes and an "Accept" and "Decline" button, a user typing a name or other identifier, and a user entering a passcode or Personal Identification Number (PIN). In some examples, the specification can require two-factor authentication (2FA) or multi-factor authentication (MFA) where a user must use an accessory or separate application in conjunction with the user interaction in the user interface. Some more advanced, and therefore more secure, user interactions can include a user providing a written signature, a user interacting with a biometric sensor, such as a fingerprint sensor or a camera for facial recognition, and a user recording a video. Other examples can include a user taking a picture of a specified object, such as a QR code. Although numerous types of user interactions are described herein, these interaction types are merely examples and are not meant as an exhaustive list. Additionally, multiple interaction types can be used in conjunction to increase the assurance level.

At stage 250, the assurance module 112 can generate a confirmation file. In an example, the assurance module 112 can be preconfigured with software code for generating the file. In another example, instructions for how to create the generation file, and what content should be included, can be included in the specification. Alternatively, assured module 112 can include a base template for a confirmation file, and the specification can include instructions for any additional content that should be added to the file. The information included in the confirmation file can depend on the type of user interaction required. For example, where a specification requires a user to select a button, the confirmation file can include a location of the selection on the user interface. In another example where a signature is required, the confirmation file can include a graphic file for the signature. Other example types of user input-related content can include inputted text, results of a 2FA or MFA check, media files, signed challenges, and a biometric confirmation.

In some examples, the confirmation file can include additional content related to the user device 100. This additional content can help increase the assurance level of the user interaction. As an example, the assurance module 112 can retrieve the location of the user device 100, such as a location reported by the user device's 100 Global Positioning System (GPS). If, for example, the reported location is outside an approved area, then the user interaction verification can be denied. Other examples of additional content can include user and device identifiers, the status of the user device 100 as compromised or not, such as whether the user device 100 has been rooted or jailbroken, the type of security used by the user device 100 to grant access to a user, and the compliance of the user device 100 based on compliance rules in the management application 120. The assurance module 112 can collect and insert into the confirmation file any other additional information that aids in providing assurance of the user interaction. In some examples, the assurance module 112 can accept or deny a user interaction based on the additional content it collects.

In some examples, the assurance module 112 can also digitally sign the confirmation file. The digital signature can be encrypted using, as an example, a cryptographic hash. The key for the hash can come from a trusted source. As some examples, the key can be stored within the assurance module 112, it can be provided by the management application 120, it can be stored in a secure container on the user device 100, or it can come from a trusted third party source.

Figure 3:
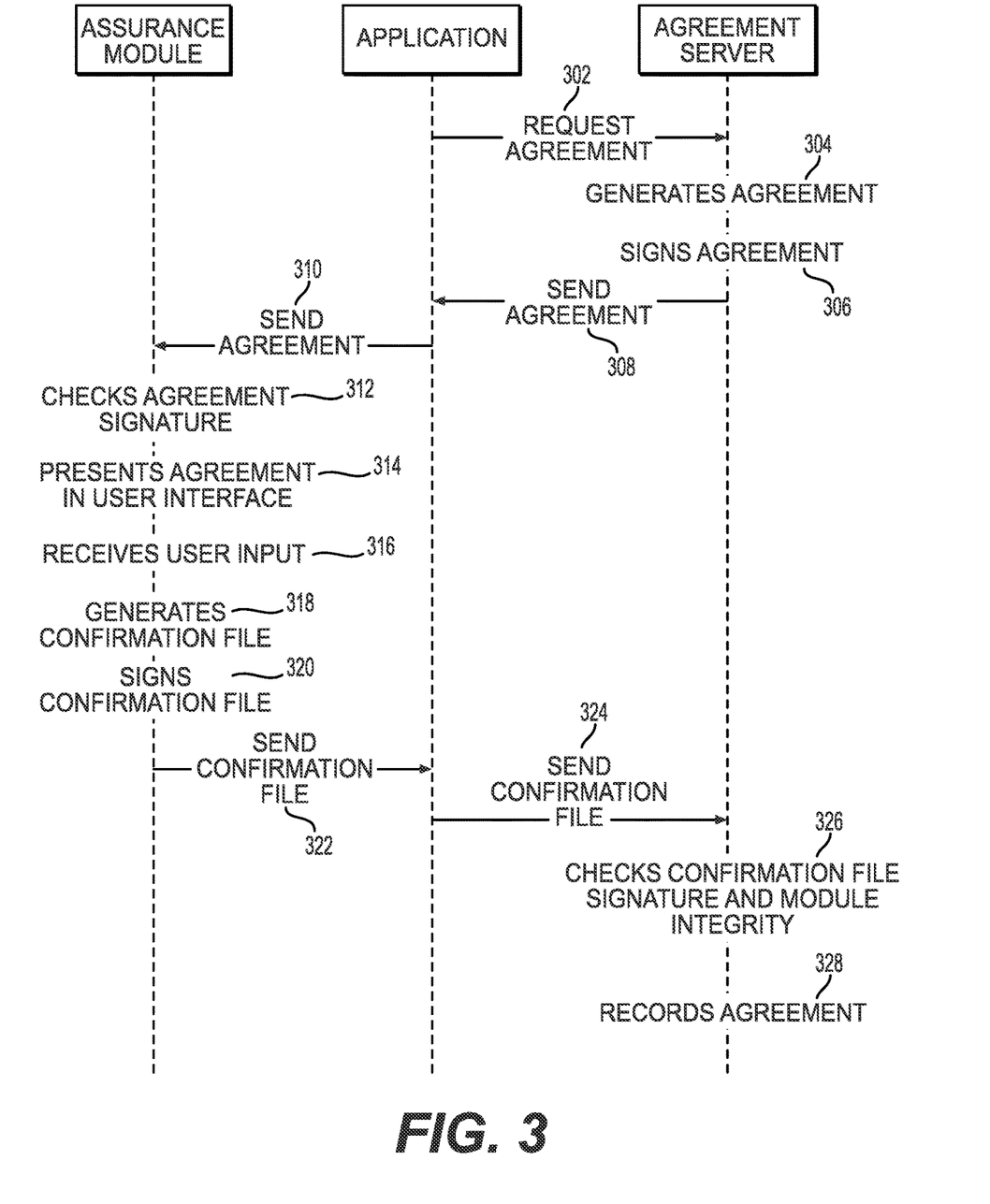
FIG. 3 is a sequence diagram of an example method for creating an assured record of a user interaction.

FIG. 3 is a sequence diagram of an example method for creating an assured record of a user interaction using a secured application module. At stage 302, the application 110 can request an agreement from the agreement service 140. In an example, the application 110 can require that a user agree to certain terms or conditions before gaining access to the application 110. When a user opens the application 110, the application 110 can send the request to the application service 140.

At stage 304, the agreement service 140 can generate the requested agreement. Generating the agreement can include generating a specification. The specification can state what actions constitute completion of the user interaction. The specification can use, for example, HTML, CSS, or JS. The signature can confirm to the assurance module 112 that the agreement service 140 authored the specification and guarantees that the code has not been altered or corrupted since it was signed. In one example, the agreement service 140 can employ a code signature verification service 160 for signing the and verifying the specification.

At stage 306, the agreement service 140 can sign the agreement. The signature can be a type of digital signature, such as a code signature, for example. The signature can confirm to the assurance module 112 that the agreement service 140 authored the specification and guarantees that the code has not been altered or corrupted since it was signed. In one example, the agreement service 140 can employ a code signature verification service 160 for signing the and verifying the specification.

At stage 308, the agreement service 140 can send the agreement to the application 110, which can forward the agreement to the assurance module 112 at stage 310. In some examples where the application 110 is a managed application, for security reasons the agreement service 140 can send the agreement to the management application 120, and the management application 120 can send the agreement to the assurance module 112.

At stage 312, the assurance module 112 can verify the agreement service signature. As an example, the agreement service 140 can digitally sign the agreement using a cryptographic hash, and the assurance module 112 can possess the key to the hash. In another example, the assurance module 112 can access the key from a trusted third-party source. The assurance model 112 can use the key to decrypt the signature and verify the agreement's authenticity.

At stage 314, the assurance module 112 can display the agreement to a user in a user interface. The agreement can be displayed on a display of the user device, as an example. In some examples, agreement can be displayed in an embedded web view control, such as ANDROID WEBVIEW or IOS WKWEBVIEW. The embedded web view control can have a restricted configuration that limits or blocks any external resources. In an example, such restrictions can be provided in the specification. Using an embedded web view control can allow the assured module 112 to support rich and standard application interactions.

In an example, the agreement can be displayed according to instructions in the specification. For example, the specification can include HTML, CSS, or JS to provides the format of the agreement in a web view control. The specification can also include interactive elements and instructions for how a user should interact with the interactive elements. Examples, of such interactive elements can include a button, a virtual keyboard, an image, and a PIN interface. The assurance module 112 can also be configured to interact with a biometric component of the user device 100, such as a fingerprint scanner. Although numerous types of user interactions are described herein, these interaction types are merely examples and are not meant as an exhaustive list. Additionally, multiple interaction types can be used in conjunction to increase the assurance level.

At stage 316, the assurance module 112 can receive user input accepting or declining the agreement. The user input received can depend on the interactive elements provided in the user interface according to the specification's instructions. For example, the assurance module 112 can display the text of the agreement for the user to review, and below the agreement text the agreement can include a "Accept" and a "Decline" button. A user can select "Accept" or "Decline" by touching the button on a touch screen or selecting the button with a mouse, for example. In an example where a signature is required, a user can use a touchscreen to sign in a designated area using a finger or stylus. In some examples that require biometric verification, a user can interact with a fingerprint scanner or direct a camera at the user's face for facial recognition.

In one example, the user may ignore the agreement that is presented. For example, the user can close the application, start another application in front of the application 110, or get otherwise distracted without providing any input for the agreement. The application 110 can be configured to handle such a situation. As some examples, the application 110 can notify the management application 120 or the management server 150, and the application 110 can deny a user access to use the application 110. For example, the application 110 can require that a user signs an EULA before use, and the application 110 can check for a confirmation file indicating acceptance of the EULA upon launch. If no such confirmation file is present, the application 110 can block the user interface until the user accepts the EULA.

At stage 318, the assurance module 112 can generate a confirmation file. The generation of the confirmation file can regardless of whether the user enters the correct user input. Because the confirmation file verifies a user interaction, a confirmation file can confirm that a user accepted an agreement, declined an agreement, entered the correct input, or entered incorrect input. As an example, the specification can instruct the assurance module 112 can prompt the user to enter a PIN. The assurance module 112 can support a looping interaction in which the user interface for inputting the PIN is re-presented until the end user enters the correct PIN, or gives up, or exceeds a specified maximum number of attempts. However, the assurance module 112 still generates a confirmation document, whatever the exit condition.

In an example, the assurance module 112 can be preconfigured with software code for generating the file. In another example, the specification can include instructions for how to create the confirmation file and what content should be included. Alternatively, assured module 112 can include a base template for a confirmation file, and the specification can include instructions for any additional content that should be added to the file. The information included in the confirmation file can depend on the type of user interaction required. For example, where a signature is required, the confirmation file can include a graphic file for the signature.

In some examples, the confirmation file can include additional content related to the user device 100. This additional content can help increase the assurance level of the user interaction. As an example, the assurance module 112 can retrieve the location of the user device 100, such as a location reported by the user device's 100 Global Positioning System (GPS). If, for example, the reported location is outside an approved area, this information can be included in the confirmation file, and the application 110 can be configured to decide whether to accept the user interaction. Other examples of additional content can include user and device identifiers, the status of the user device 100 as compromised or not, such as whether the user device 100 has been rooted or jailbroken, the type of security used by the user device 100 to grant access to a user, and the compliance of the user device 100 based on compliance rules in the management application 120. The assurance module 112 can collect and insert into the confirmation file any other additional information that aids in providing assurance of the user interaction. The application 110 can accept or deny a user interaction based on all or a portion of the contents in the confirmation file.

At stage 320, the assurance module 112 can digitally sign the confirmation file. The digital signature can be encrypted using, as an example, a cryptographic hash. The key for the hash can come from a trusted source. As some examples, the key can be stored within the assurance module 112, it can be provided by the management application 120, it can be stored in a secure container on the user device 100, or it can come from a trusted third party source.

At stage 322, the assurance module 112 can send the confirmation file to the application 110, and the application 110 can send the confirmation file to the agreement server 140 at stage 324. In an example, the assurance module 112 can hand the confirmation file over to the management application 120 instead of the application 110. In some examples, the assured module 112 can store the confirmation file on the user device 100. For example, the confirmation file can be stored in a location accessible by the management application 120. This can allow the management application 120 to use the confirmation file for other managed applications. As an example, a second application can require the same verified user interaction with a similar agreement to the application 110. The second application can be configured to accept the confirmation file from the application 110, thereby eliminating the need to go through the assurance process a second time.

At stage 326, the agreement service 140 can verify the integrity of the confirmation file and the assurance module 112. For example, the agreement service 140 can use a hash key to decrypt a code signature provided by the assurance module 112 in the generation file. Decrypting the code signature can verify both the integrity of the assurance module 112 and that the confirmation file has not been tampered with. At stage 328, upon verifying the confirmation file, the agreement service 140 can record the agreement. In an example, the agreement can be recorded in a secure location on a server, such as a server in the UEMS. The agreement service 140 can also make the confirmation file accessible to other trusted devices. For example, the user can have multiple user devices that have the same application 110. When the user accesses the application 110 on a second user device, the application 110 can request an agreement. However, instead of generating a new agreement for assurance, the agreement service 140 can verify that the confirmation file for the application 110 and the user's profile already exists. The agreement service 140 can send confirmation, or a copy of the confirmation file, to the second user device so that the user can access the application 110.

Figure 4A:
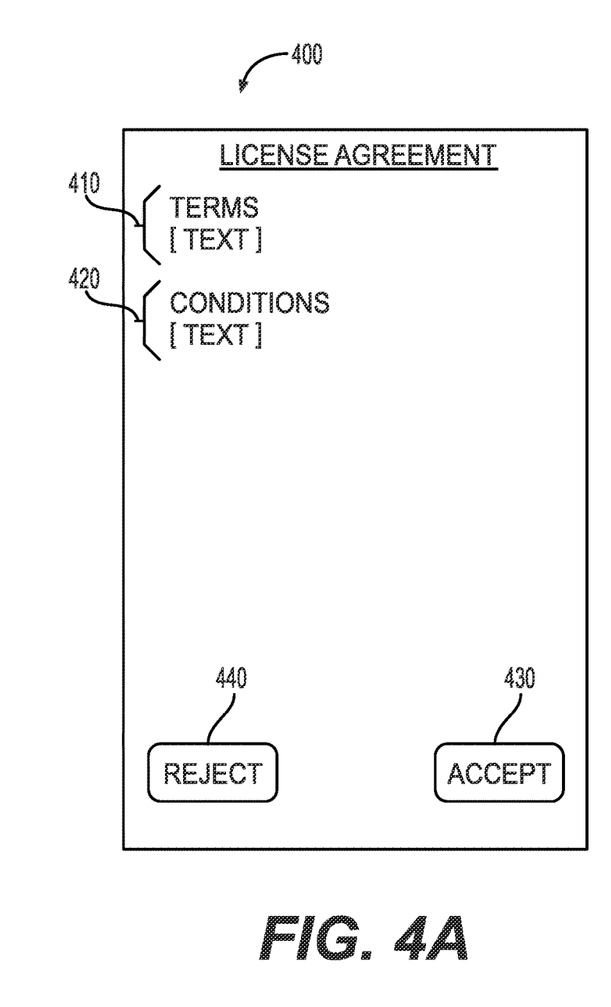
FIG. 4A is an illustration of an example graphical user interface (GUI) of a display used to perform the various methods described herein.
Figure 4B:
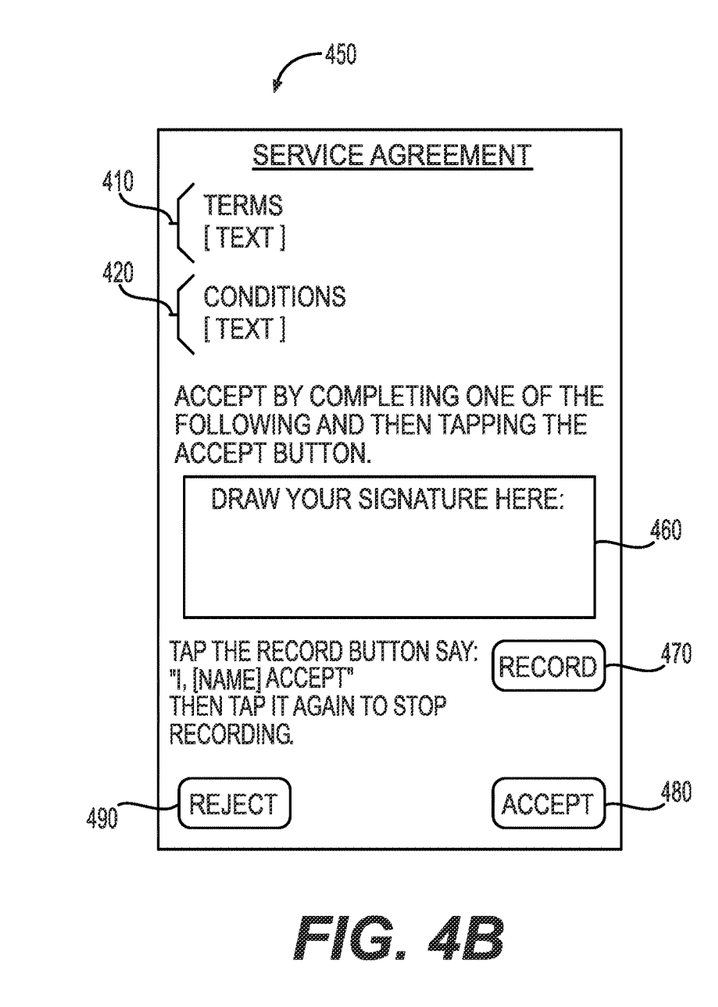
FIG. 4B is an illustration of another example GUI of a display used to perform the various methods described herein.

FIGS. 4A and 4B illustrate GUIs of two example agreements as presented to a user in a display. FIG. 4A is an illustration of GUI of an example EULA 400. The EULA 400 can include terms 410 and conditions 420. The terms 410 can include text indicating any terms that a user must agree to, and likewise for the conditions 420. The EULA 400 can also include an Accept button 430 and a Reject button 440. After a user selects one of the two buttons the assured module 112 can proceed to generate a confirmation file indicating whether the user accepted or rejected the EULA.

FIG. 4B is an illustration of GUI of an example service agreement 450. The service agreement 400 can also include terms 410 and conditions 420 with their respective text. The service agreement 450 can also include a signature box 460. The signature box 460 can be configured to receive a handwritten digital signature from a user. The service agreement 450 can also include a recording element 470. The recording element 470, when selected, can utilize a microphone on the user device 100 to record the user speaking a certain phrase. As shown in FIG. 4B, the service agreement 450 can instruct the user on what to say. The voice recording can be used as a biometric verification method or to add another level of assurance to the user interaction. Like the EULA 400, the service agreement 450 can also include an Accept button 480 and a Reject button 490.

Figure 5:
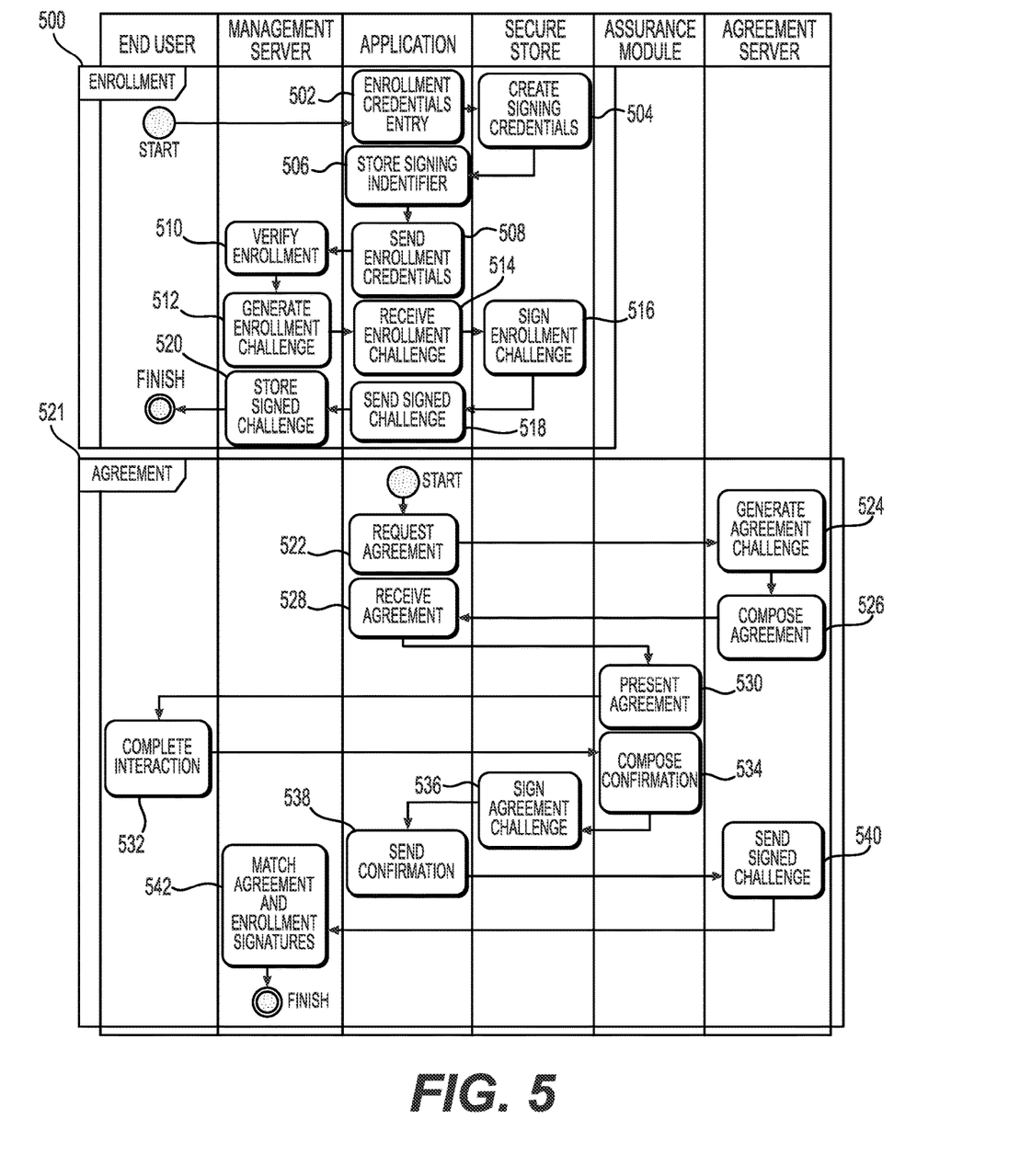
FIG. 5 is a flowchart of an example method for creating an assured record of a user interaction in an enterprise environment.

FIG. 5 is a flowchart of an example method for creating an assured record of a user interaction in an enterprise environment using a secure module. Section 500 of FIG. 5 includes stages that illustrate an example enrollment method by which the user device 100 can enroll with a UEMS. Section 521 includes stages that illustrate an example method for creating an assured record of a user interaction on an enrolled user device.

At stage 502, the management application 120 can receive enrollment credentials. In an example, the enrollment credentials can be received as part of a request to enroll the user device 100 with a UEMS. For example, a user can enter the enrollment credentials into the management application 120. At stage 504, a secure store on the user device 100 can create a signing identifier, which the management application 120 can store at stage 506. In an example, the secure store can be a secured portion of the user device 100 that safeguards and manages security keys, such as a hardware security module (HSM). At stage 508, the management application 120 can send the enrollment credentials to the management server 150. Upon receiving the enrollment credentials, the management server 150 can verify them at stage 510. In an example, the management server 150 can also generate an enrollment challenge at stage 512. In an example, the agreement challenge can be a data file that requires a digital signature from the secure store. The enrollment challenge can be used as an added security feature. At stage 514, the management server 150 can send the enrollment challenge to the management application 120. At stage 516, the secure store can sign the enrollment challenge and return it to the management application 120. In one example, the enrollment challenge can require user interaction, such as by entering a temporary code from a trusted third-part source, such as GOOGLE AUTHENTICATOR. In an example, the enrollment challenge can include the management application digitally signing the enrollment challenge using a code signature. At stage 518, the management application 120 can send the signed enrollment challenge to the management server 150, which the management server 150 can store at stage 520.

After the user device 100 is enrolled, at stage 522, the management application 120 can request an agreement from the agreement service 140 that requires assurance. In an example, the agreement request can include the signing identifier previously created by the secure store. At stage 524, the agreement service 140 can generate an agreement challenge. Like the enrollment challenge, the agreement challenge can be a data file that requires a digital signature from the secure store. At stage 526, the agreement service 140 can also an agreement. In an example, the agreement can include a specification. The agreement service 140 can send the agreement and challenge to the management application 120, which can be received at stage 528.

At stage 530, the management application 120 can sent agreement to the assurance module 112. The assurance module 112 can present the agreement to the user in an interface according to the specification's instructions, and at stage 532 the user can complete the required interaction. At stage 534, the assurance module 112 can generate a confirmation file. In an example, the assurance module 112 can verify the user interaction, such as by verifying that a correct PIN was entered, and include the verification in the confirmation file. In one example where the user interaction cannot be verified, such as where the user enters an incorrect PIN, the assurance module 112 can generate the confirmation file indicating such. Some examples of information that can be part of the confirmation file include the agreement, the user input, a digital signature, and information relating to the user device 100.

At stage 536, the secure store can sign the confirmation file of the agreement challenge. The signature can be a digital signature, such as a code signature, for example. In an example, the secure store can sign the confirmation file with the same signature it used at stage 516 to sign the enrollment challenge. The signature on the confirmation file can be used to verify the identity of the user device 100. For example, once signed, the secure store can send the confirmation file to the management application 120. The management application 120 can in turn send the confirmation file to the agreement server 140 at stage 538. As an additional security feature to other examples described herein, at stage 540 the application service 140 can send the confirmation file to the management server 150. At stage 542, the management server 150 can compare the signatures on the confirmation file and the enrollment challenge to make sure they match. This can help assure that the device that enrolled is the same device that generated the confirmation file.

Figure 6:
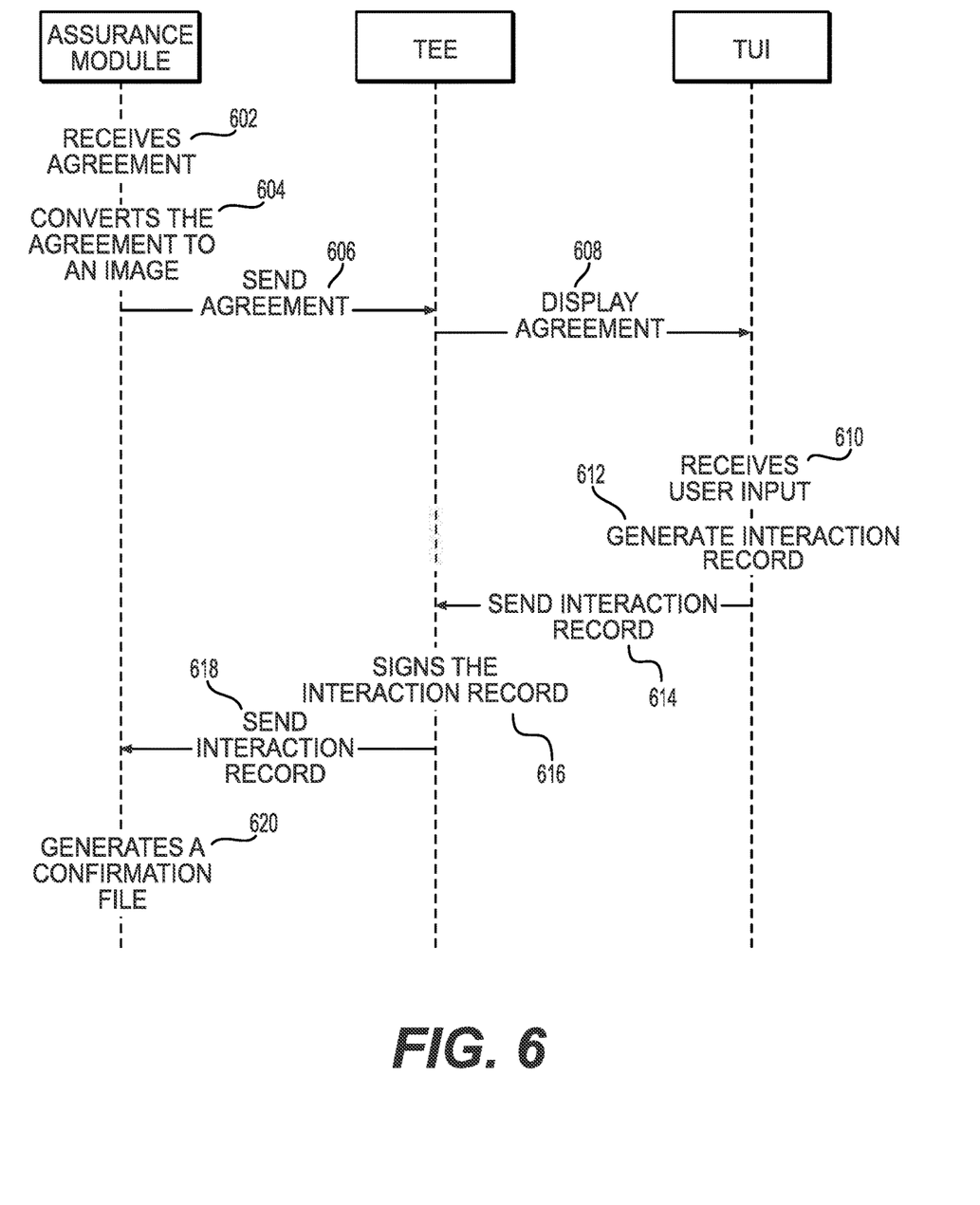
FIG. 6 is a sequence diagram of an example method for creating an assured record of a user interaction using a Trusted Execution Environment.

FIG. 6 is a flowchart of an example method for creating an assured record of a user interaction using a TEE. At stage 602, the assurance module 112 can receive an agreement that requires assurance. In an example, the application 110 can request an agreement from the agreement service 140. The agreement service 140 can then generate and send the requested agreement to the agreement service 140. In one example, the agreement service 140 can digitally sign the agreement using, for example, a cryptographic hash for which the assurance module 112 has a key.

In an example, the agreement can be part of, or be accompanied by, a specification. The specification can state what actions constitute completion of the user interaction. For example, the specification can include code or other instructions that the assured module 112 must follow to properly confirm the user interaction, including any visual and/or interactive elements needed to do so.

At stage 604, the assurance module 112 can render the agreement as an image. The assurance module 112 can do this because of the limited functionality of TUIs and TEEs. For example, TUI and TEE products are designed to operate at only the most rigorous level of security and must be certified for that. To enable their certification, TUI and TEE implementations can only have very limited capabilities for interaction and can offer only a very limited programming platform. This makes user interface design and programming specialized. For example, TUI products are limited to hardware interfaces that can be built with the most rigorous security. TUI functionality cannot be extended without the introduction of new hardware design and manufacture. As an example, to support trusted audio recording, a TUI would require that a microphone connection could be secured to the same level of rigor as its TEE. For these reasons, TUIs are only capable of some of the most basic interactions, such as displaying text or an image. For this reason, utilizing TUI 132 with the assurance model 110 to provide assurance of a user interaction can require that the agreement be rendered down to a simplified form, such as a form using only text or an image.

In an example, assurance module 112 can also generate a list of coordinates defining activity zones on the image, such as buttons. An example of such an image coordinate system is provided in greater detail below regarding FIG. 8.

At stage 606, the assurance module 112 can send the agreement to the TEE 130, which can then display the agreement in the TUI 132 at stage 608. For example, the TEE can take over a display of the user device 100 from the device's OS. The TUI can display the image of the agreement on the display.

At stage 610, the TUI 132 can receive user input. Although the agreement is presented as an image, the TUI 132 can record the user inputs using the coordinate system. For example, the image can include a portion that appears as an "Accept" button, such as element 430 in FIG. 4A. The user can touch or select the Accept button, and the TUI 132 can record the location of the touch, The TUI 132 can also record any additional user inputs in the order they are received. For example, the image can include the numbers 0-9 and instructions for the user to enter a PIN. Each number can have an assigned activity or interaction zone. The user can touch or select the image portions corresponding to the PIN numbers in the correct order. The TUI 132 can record the coordinates of the touch locations and the order in which they were received. The coordinates can then be compared to the assigned activity zones to ensure that the correct pin was entered. At stage 612, the TUI 132 can generate an interaction record that includes the user input described above. Alternatively, this stage can be performed by the TEE 130.

Not all TUIs have the capability of receiving and recording user inputs. Accordingly, one example can include displaying the agreement in a user interface (UI) of the user device 100 instead of the TUI 132. The UI can receive user the user inputs, and an image that includes the entered values can be generated. This can be done, for example, by displaying the value as it is typed and taking a simple screen capture, or by processing the image if the value was not displayed or was displayed in an obfuscated form. The image with the value can then be displayed in the TUI 132, and a confirmation file can be created that includes the image.

At stage 614, the TUI 132 can hand over the interaction record to the TEE 130, and at stage 616, the TEE 130 can sign the interaction record using a stored agreement signing key (ASK). For example, the TEE 130 can be programmed to safeguard and manage security keys. In an example, the ASK can be a key that is generated inside, and never leaves, the TEE 130. The ASK can also be a private key to which the agreement service 140 has a corresponding public key. In an example, the ASK can be attested by a trusted internet service, such as part of a secure manufacturing infrastructure.

At stage 618, the TEE 130 can hand over the signed interaction record to the assurance module 112. In some examples, the signed interaction record can serve as the assurance of the user interaction. Alternatively, at stage 620, the assurance module 112 can generate a confirmation file that includes the signed interaction record. In an example, the assurance module 112 can be preconfigured with software code for generating the file. In another example, instructions for how to create the generation file, and what content should be included, can be included in the specification. Alternatively, assured module 112 can include a base template for a confirmation file, and the specification can include instructions for any additional content that should be added to the file.

In some examples, the confirmation file can include additional content related to the user device 100. This additional content can help increase the assurance level of the user interaction. As an example, the assurance module 112 can retrieve the location of the user device 100, such as a location reported by the user device's 100 Global Positioning System (GPS). If, for example, the reported location is outside an approved area, then the user interaction verification can be denied. Other examples of additional content can include user and device identifiers, the status of the user device 100 as compromised or not, such as whether the user device 100 has been rooted or jailbroken, the type of security used by the user device 100 to grant access to a user, and the compliance of the user device 100 based on compliance rules in the management application 120. The assurance module 112 can collect and insert into the confirmation file any other additional information that aids in providing assurance of the user interaction. In some examples, the application 110 can accept or deny a user interaction based on all or a portion of the contents in the confirmation file.

Figure 7:
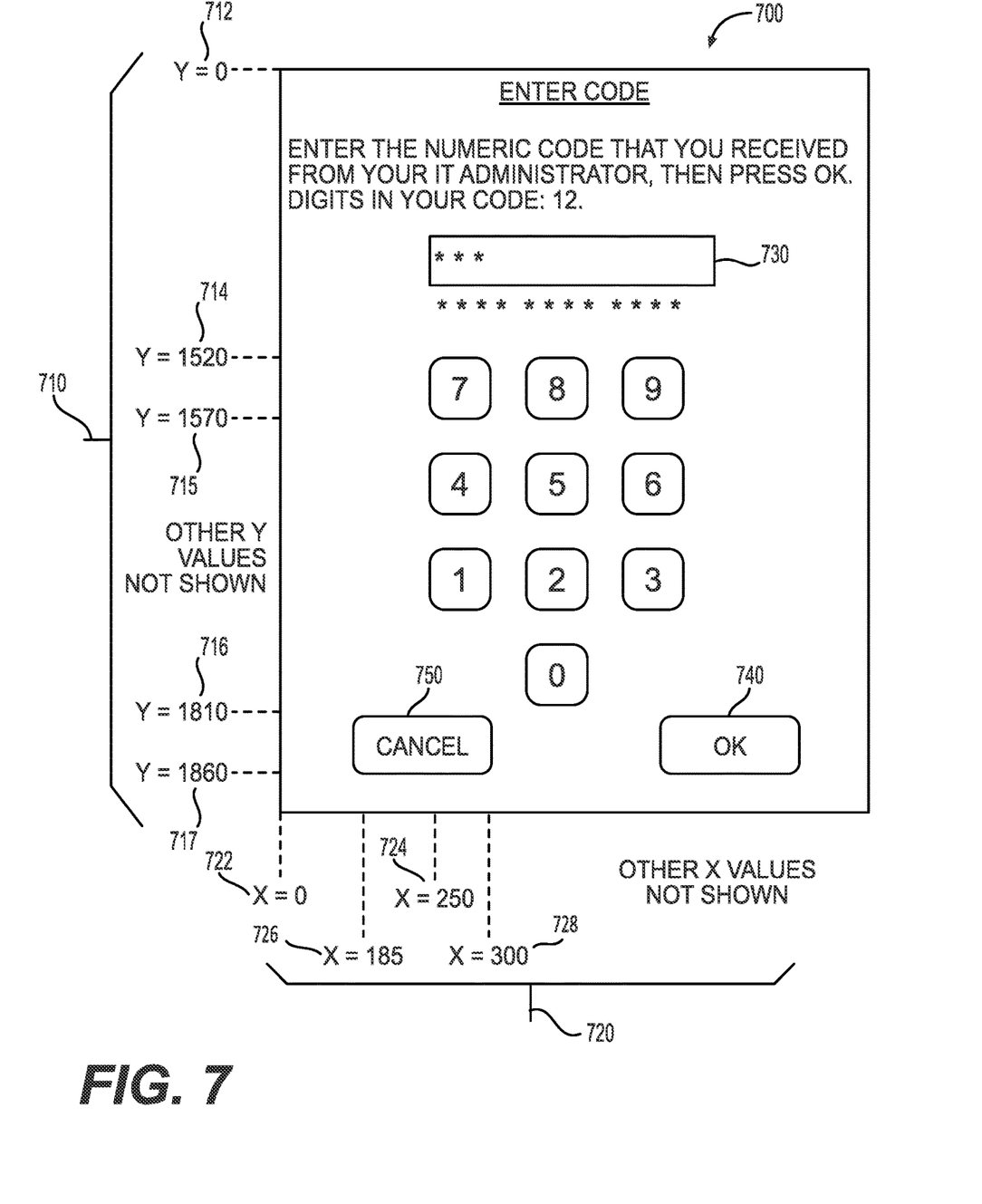
FIG. 7 is an illustration of an example GUI of a display used to perform various methods described herein.

FIG. 7 is an illustration of an example TUI 132 that includes an image 700 for an agreement that requires assurance. The TUI 132 can include a two-axis coordinate system with y-axis 710 and x-axis 720. Ranged combinations of y-axis 710 coordinates and x-axis 720 coordinates can define activity or interaction zones. For example, x-axis 720 can begin at the left side of image 700 at x-coordinate 722 (x=0) and the y-axis 710 can begin at the top of image 700 at y-coordinate 715 (y=0). The area of the image 700 defined by a y-axis 710 range from first y-coordinate 714 (y=1520) to second y-coordinate 715 (y=1570) combined with an x-axis 720 range from first x-coordinate 724 (x=250) to second x-coordinate 726 (x=300) can designate a number "7" selection. Similarly, the area of the image 700 defined by a y-axis 710 range from third y-coordinate 716 (y=1810) to fourth y-coordinate 717 (y=1860) combined with an x-axis 720 range from third x-coordinate 726 (x=185) to second x-coordinate 728 (x=300) can designate a "Cancel" selection of Cancel button 750. Similar activity zones can be defined for each number as well as an "OK" button 740. In some examples, the TUI 132 can also include a pass code display area 730 that displays to a user the selected numbers or the number of numbers that have been selected.

In some examples, the TUI 132 can record the coordinates of where a user touches or selects on the display (also called a selection location). The TUI 132 can determine whether the coordinates of the selection correspond to an activity zone, and, if so, the TUI 132 can associate the selection corresponding to the coordinates. As an example, where the TUI 132 receives a user input at the coordinates x=275; y=1550, the TUI 132 can associate that user input with a selection of the number "7." Alternatively, where the TUI 132 receives a user input at the coordinates x=200; y=1840, the TUI 132 can associate that user input with a selection of the Cancel button 750. In some examples, the TUI 132 can merely record inputs as coordinates and include the coordinates in the interaction record. The TUI 132 can also understand that tapping the "Cancel" or "OK" area should end the interaction, and it should then relinquish control of the UI of the device 100. When the assurance module 132 receives the interaction record it can generate and sign a confirmation file that includes the user inputs.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for creating an assured record of a user interaction, comprising:
   receiving, at an application installed on a user device, an agreement requiring assurance, the agreement having instructions for generating a confirmation file of a user interaction with the agreement;
   providing the agreement to a module of the application, the module performing stages comprising:
   presenting the agreement in a user interface;
   receiving the user interaction, the user interaction indicating acceptance of the agreement according to the instructions;
   generating the confirmation file based on the instructions, the confirmation file including the user interaction;
   providing the confirmation file to a secure store of the user device; and
   receiving, from the secure store, the confirmation file, the confirmation file having been signed by the secure store using a digital signature.

2. The method of claim 1, wherein the agreement is received from a server in response to a request from the application.

3. The method of claim 2, the stages further comprising sending, by the application, the confirmation file to the server, wherein the server verifies and records the confirmation file.

4. The method of claim 2, wherein the agreement further includes a signature from the server, and the stages performed by the module further comprise verifying that that the agreement came from the server using the signature.

5. The method of claim 1, wherein the instructions include a command to execute a script as part of generating the confirmation file, the script being securely stored within the module.

6. The method of claim 1, wherein the secure store is a hardware security module.

7. The method of claim 1, wherein the application is not a trusted application, and the module has a restricted configuration that prohibits the application from performing any actions not specified in the instructions.

8. A non-transitory, computer-readable medium containing instructions that, when executed by a hardware-based processor, performs stages for creating an assured record of a user interaction, the stages comprising:
   receiving, at an application installed on a user device, an agreement requiring assurance, the agreement having instructions for generating a confirmation file of a user interaction with the agreement;
   providing the agreement to a module of the application, the module performing additional stages comprising:
   presenting the agreement in a user interface;
   receiving the user interaction, the user interaction indicating acceptance of the agreement according to the instructions;
   generating the confirmation file based on the instructions, the confirmation file including the user interaction;
   providing the confirmation file to a secure store of the user device; and
   receiving, from the secure store, the confirmation file, the confirmation file having been signed by the secure store using a digital signature that the secure store previously provided during an enrollment of the user device with a management server;
   receiving, at the application, the signed confirmation file;
   sending the signed confirmation file to the management server; and
   receiving, from the management server, authorization for granting access to the application at the user device, wherein the authorization is based on the management server having verified that the digital signature used to sign the confirmation file matches the digital signature previously provided by the secure store.

9. The non-transitory, computer-readable medium of claim 8, wherein the agreement is received from a server in response to a request from the application.

10. The non-transitory, computer-readable medium of claim 9, the stages further comprising sending, by the application, the confirmation file to the server, wherein the server verifies and records the confirmation file.

11. The non-transitory, computer-readable medium of claim 9, wherein the agreement further includes a signature from the server, and the stages performed by the module further comprise verifying that that the agreement came from the server using the signature.

12. The non-transitory, computer-readable medium of claim 8, wherein the instructions include a command to execute a script as part of generating the confirmation file, the script being securely stored within the module.

13. The non-transitory, computer-readable medium of claim 8, wherein the secure store is a hardware security module.

14. The non-transitory, computer-readable medium of claim 8, wherein the application is not a trusted application, and the module has a restricted configuration that prohibits the application from performing any actions not specified in the instructions.

15. A system for creating an assured record of a user interaction, comprising:
  a memory storage including a non-transitory, computer-readable medium comprising instructions; and
  a computing device including a hardware-based processor that executes the instructions to carry out stages comprising:
    receiving, at an application installed on a user device, an agreement requiring assurance, the agreement having instructions for generating a confirmation file of a user interaction with the agreement;
    providing the agreement to a module of the application, the module performing additional stages comprising:
      presenting the agreement in a user interface;
      receiving the user interaction, the user interaction indicating acceptance of the agreement according to the instructions;
      generating the confirmation file based on the instructions, the confirmation file including the user interaction;
      providing the confirmation file to a secure store of the user device; and
      receiving, from the secure store, the confirmation file, the confirmation file having been signed by the secure store using a digital signature that the secure store previously provided during an enrollment of the user device with a management server;
    receiving, at the application, the signed confirmation file;
    sending the signed confirmation file to the management server; and
    receiving, from the management server, authorization for granting access to the application at the user device, wherein the authorization is based on the management server having verified that the digital signature used to sign the confirmation file matches the digital signature previously provided by the secure store.

16. The system of claim 15, wherein the agreement is received from a server in response to a request from the application.

17. The system of claim 16, the stages further comprising sending, by the application, the confirmation file to the server, wherein the server verifies and records the confirmation file.

18. The system of claim 16, wherein the agreement further includes a signature from the server, and the stages performed by the module further comprise verifying that that the agreement came from the server using the signature.

19. The system of claim 15, wherein the instructions include a command to execute a script as part of generating the confirmation file, the script being securely stored within the module.

20. The system of claim 15, wherein the secure store is a hardware security module.

* * * * *